United States Patent
Brahmavar et al.

(10) Patent No.: US 6,531,794 B1
(45) Date of Patent: Mar. 11, 2003

(54) METHOD FOR FABRICATING MOTORS OF DIFFERENT OUTPUTS USING STANDARDIZED PARTS

(75) Inventors: Subhash M. Brahmavar, Fort Wayne, IN (US); Harold B. Harms, Fort Wayne, IN (US); David M. Erdman, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/619,956

(22) Filed: Jul. 20, 2000

(51) Int. Cl.[7] .............................................. H02K 15/03
(52) U.S. Cl. ...................... 310/42; 310/156.01; 29/596; 29/598
(58) Field of Search ..................... 29/596, 598; 310/42, 310/156; 703/1

(56) References Cited

U.S. PATENT DOCUMENTS

| | | | |
|---|---|---|---|
| 3,759,019 A | * 9/1973 | Wells | .......................... 56/10.5 |
| 3,979,619 A | * 9/1976 | Whitely | ....................... 310/268 |
| 4,417,167 A | * 11/1983 | Ishii et al. | ................. 310/67 R |
| 4,574,210 A | * 3/1986 | Wieland | ........................ 310/59 |
| 4,679,313 A | * 7/1987 | Schultz et al. | ............ 264/272.2 |
| 4,835,839 A | 6/1989 | Forbes et al. | |
| 4,922,604 A | 5/1990 | Marshall et al. | |
| 4,939,398 A | * 7/1990 | Lloyd | ........................... 29/598 |
| 4,984,353 A | * 1/1991 | Santandrea et al. | ......... 242/440 |
| 5,149,477 A | * 9/1992 | Yamashita et al. | .......... 148/101 |
| 5,265,321 A | 11/1993 | Nelson et al. | |
| 5,789,831 A | 8/1998 | Kregling | |
| 5,918,360 A | 7/1999 | Forbes et al. | |
| 6,139,765 A | * 10/2000 | Kitazawa et al. | ......... 252/62.55 |
| 6,139,766 A | * 10/2000 | Taguchi et al. | ........... 252/62.57 |

OTHER PUBLICATIONS

Hendershot et al., "Design of Brushless Permanent–Magnet Motors" Chap. 3, 1994.*

* cited by examiner

Primary Examiner—Burton S. Mullins
(74) Attorney, Agent, or Firm—Armstrong Teasdale LLP

(57) ABSTRACT

A method for varying motor output using magnets of different fluxes includes manufacturing standardized parts, ascertaining desired motor output, selecting from a group of interchangeable magnets to provide the desired output, and assembling a motor with the selected magnets and standardized parts such that the desired output is provided. Additionally, a motor kit including a rotor configured to accommodate magnets of varying residual induction values and lengths, a stator configured to operate with the rotor, and a plurality of interchangeable magnets with different residual induction values and lengths.

14 Claims, 3 Drawing Sheets

METHOD FOR FABRICATING MOTORS OF DIFFERENT OUTPUTS USING STANDARDIZED PARTS

BACKGROUND OF THE INVENTION

This invention relates generally to electric motors, and more particularly to brushless DC motors with permanent magnets.

Known brushless DC electric motors typically include a motor housing, a stator, and a rotor assembly. The stator includes a stator core having a bore therethrough. The rotor assembly is rotatably mounted in the housing, extends through the stator bore, includes a rotor core and a rotor shaft extending through the core. Typically, the rotor core has at least one permanent magnet mounted thereon. The housing includes a shell and two endshields and houses at least a portion of the rotor assembly. Electric motors also include at least one bearing sized to receive the rotor shaft. The endshields attach to ends of the housing shell and support the bearings. This particular construction is conventionally known as an "inner rotor" motor construction. The invention described herein pertains to motors with "inner rotor" motor construction, as well as motors with an inside out "outer rotor" motor construction.

During operation, the brushless DC motor utilizes electronic switching to provide torque. Typically, a motor controller receives a position feedback signal from a sensor inside the motor. The sensor ensures that excitation to the stator field always leads the permanent-magnet field to produce torque. The torque and power output of a DC motor are directly related to magnet energy level. More particularly, the amount of output is directly related to the residual induction level (Br) of the permanent magnets.

Sometimes, motor manufacturers fabricate a base motor and then develop a product line of motors with different outputs based upon the base motor but with different dimensions. For example, "stacking out" is a common method to vary the output. "Stacking out" means to increase the length of the motor depending upon output needs. However, changing the length of a motor requires different length parts and raises costs for the manufacturer.

Accordingly, a manufacturer must design, manufacture, and stock parts of varying dimensions to fabricate motors with different outputs forming a typical motor product line. Typical parts with varying dimensions include a stator, a stator core, a rotor shaft, a rotor core, and a motor housing. For example, 6-inch, 8-inch, and 10-inch rotor shafts might all be utilized in the same base motor to provide different output motors obtained from increasing lengths of stators and rotors. However, designing, manufacturing, and stocking 3 different length parts is more expensive than designing, manufacturing, and stocking 1 standardized part.

BRIEF SUMMARY OF THE INVENTION

A method for fabricating motors of different outputs using standardized parts includes fabricating standardized parts, ascertaining desired motor output, selecting at least one magnet from a group of interchangeable magnets to provide the desired output, and assembling a motor with the selected magnet and standardized parts such that the desired output is provided.

The interchangeable magnets have different Br values and, when interchanged in a motor, will vary the output of the motor. Since the selection is made after the standardized parts are fabricated, the output of the motor can be determined in the final stages of assembly and thus a motor manufacturer is able to respond quickly to market forces.

Accordingly, a method is provided to fabricate motors of different outputs using standardized parts wherein the output is changeable during final assembly. The invention described herein applies to motors with "inner rotor" motor construction, as well as motors with an inside out "outer rotor" motor construction.

DETAILED DESCRIPTION OF THE INVENTION

Figure 1:
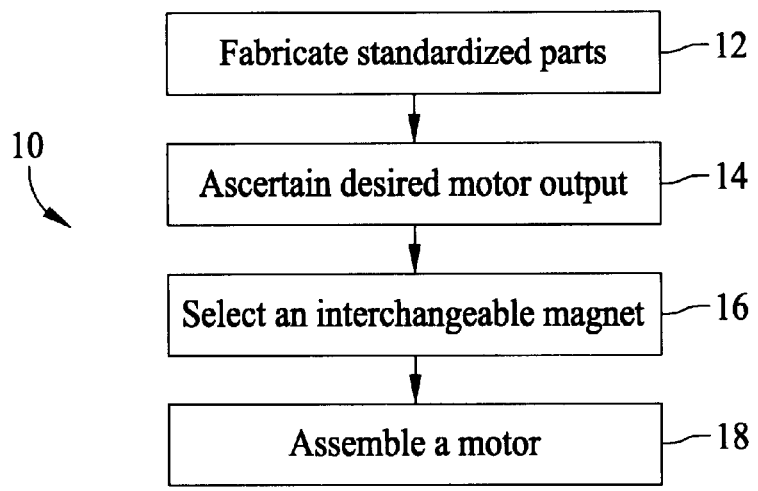
FIG. 1 is a schematic view of an exemplary method of fabricating motors.

FIG. 1 is a schematic view of an exemplary method 10 of fabricating motors including fabricating 12 standardized motor parts. Fabricating 12 standardized motor parts includes fabricating a rotor configured to accommodate magnets of varying residual induction values. Method 10 also includes ascertaining 14 desired motor output and selecting 16 at least one magnet from a group of interchangeable magnets to substantially provide the desired motor output. Method 10 further includes assembling 18 the motor with the selected magnet and interchangeable parts such that the desired output is substantially provided. Selecting 16 from a group of interchangeable magnets includes selecting magnets of different lengths.

In an alternative embodiment, selecting 16 from a group of interchangeable magnets includes selecting from ferrite bonded magnets and rare earth bonded magnets, such as, for example, Neodymium and Samarium Cobalt. In another alternative embodiment, selecting 16 from a group of interchangeable magnets includes selecting from ferrite bonded magnets of varying lengths and rare earth bonded magnets of varying lengths. It is contemplated that the benefits of the present invention accrue to all types of magnets, such as, for example, cast magnets and sintered magnets with varying residual induction values.

Figure 2:
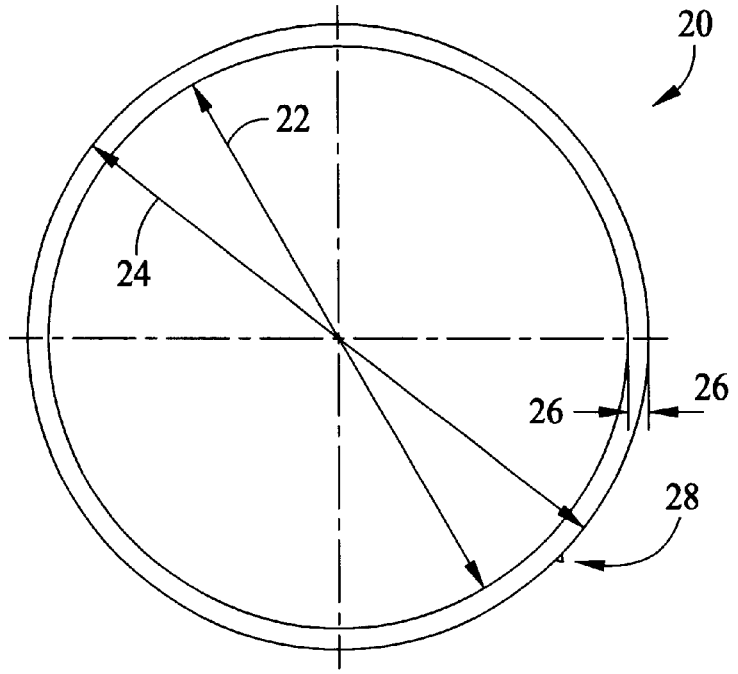
FIG. 2 is an end view of a ring magnet.

FIG. 2 is an end view of a ring magnet 20 including an inner diameter 22 and an outer diameter 24 providing a thickness 26. In an exemplary embodiment, inner diameter 24 is 3.012 inches ±0.005 inch, outer diameter 24 is 3.172 inch 35 0.005 inch, and thickness 26 is 0.080 inch ±0.005 inch. Ring magnet 20 also includes eight crush ribs 28 equally spaced around a perimeter (not shown) of ring magnet 20. For illustrative purposes, only one crush rib 28 is shown. In an exemplary embodiment, ring magnet 20 is a ferrite bonded magnet with a length (not shown in FIG. 2) of 0.875 inch, a Br of 2500 Gauss, and which generates an output in the range of 40–50 watts in an 84 mm brushless DC motor available from the General Electric Company. Alternatively, ring magnet 20 generates an output in the range of 15–20 watts in a 58 mm brushless motor available from the General Electric Company. In yet another embodiment, ring magnet 20 is a Neodymium bonded magnet with a length (shown in FIG. 4) of 0.625 inch, a Br of 5400 Gauss, and which generates an output in the range of 80–90 watts in an 84 mm brushless DC motor available from the General Electric Company. Alternatively, ring magnet 20 generates an output in the range of 2–4 watts in a 58 mm brushless motor available from the General Electric Company. Accordingly, two, or more, motors may be fabricated from the same parts (e.g., stator, stator core, rotor shaft, rotor core, endshield, and motor housing) yet may have different outputs depending upon which magnet is selected.

Figure 3:
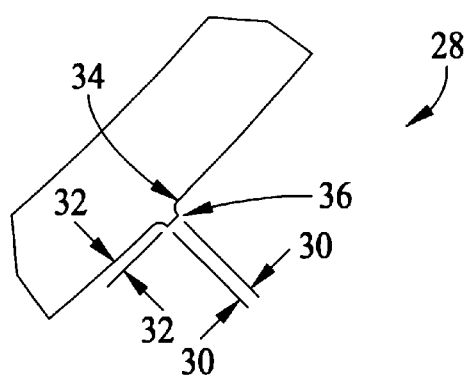
FIG. 3 is an end view of a crush rib for the ring magnet shown in FIG. 2.

FIG. 3 is an end view of crush rib 28 for ring magnet 20 shown in FIG. 2 including a width 30, a height 32, an inner radius 34, and an outer radius 36.

In an exemplary embodiment, width 30 is 0.015 inch±0.002 inch, height 32 is 0.012 inch ±0.002 inch, and radii 34 and 36 are typically 0.005 inch.

Figure 4:
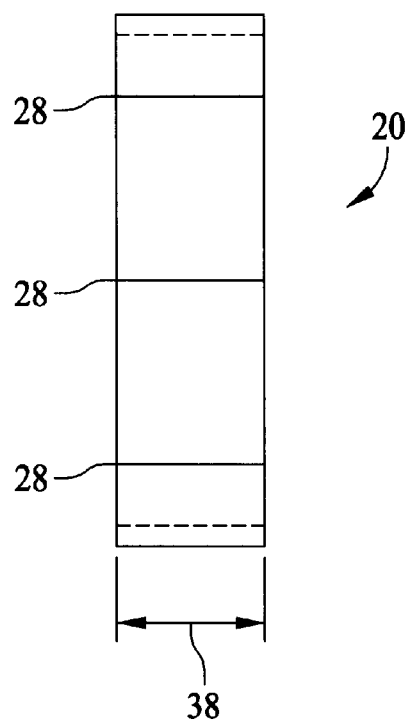
FIG. 4 is a side view of the ring magnet shown in FIG. 2.

FIG. 4 is a side view of ring magnet 20 shown in FIG. 2 including a length 38 and a plurality of crush ribs 28 equally spaced. Length 38 is varied to alter flux output values of ring magnet 20. In an exemplary embodiment, length 38 is less than approximately 1 inch and greater than approximately 0.4 inch.

Figure 5:
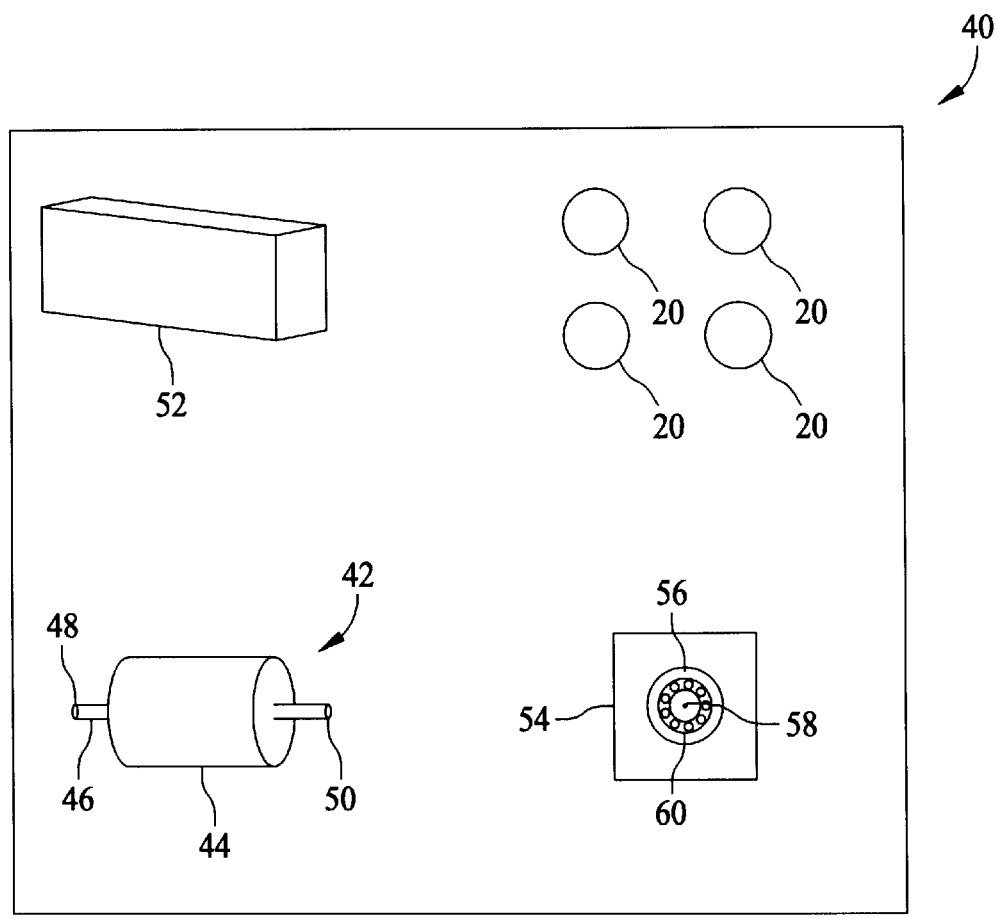
FIG. 5 is a top plan view of a motor kit.

FIG. 5 is a top plan view of a kit 40 including a plurality of ring magnets 20, a rotor assembly 42 including a rotor core 44 and a rotor shaft 46 including a first end portion 48 and a second end portion 50. Kit 40 also includes a motor housing 52 including a stator (not shown), an endshield (not shown) and a bearing (not shown). Kit 40 further includes a housing cover 54 including an endshield 56 and a bearing 58. Housing cover 54 also includes a void 60 sized to accommodate rotor shaft 46. In an exemplary embodiment, rotor assembly 42 is configured to accept surface-mounted magnets of varying residual induction values. It is contemplated that the benefits of the present invention accrue to rotors with alternative rotor topologies, such as, for example, inset magnet rotors, as well as interior magnet rotors with either radial or circumferential magnetization.

The invention described herein embodies the method of obtaining motors of various output by using magnets of different residual induction while keeping the magnet dimensions constant. Alternatively and within the scope of the present invention, motors of various output are obtained by varying the length of the magnets while keeping the residual induction of the magnets constant. Furthermore, motors of various output may be obtained by varying the length of the magnets as well as the residual induction of the magnets. It is contemplated that the present invention may be practiced with a variety of motor configurations including the "inner rotor" motor construction and the inside out "outer rotor" motor construction.

In practice, after receiving a customer order, the motor manufacturer selects the appropriate ring magnet from magnets 20, affixes selected ring magnet 20 to rotor core 44, and positions rotor assembly 42 in motor housing 52 by positioning rotor first end portion 48 within the bearing (not shown) of housing 52. Housing 52 is sealed by attaching housing cover 54 to housing 52 such that rotor second end portion 50 is supported by bearing 58. Accordingly, a motor (not shown) is assembled. In an alternative embodiment, the operation described above may be performed by the customer.

For example, a motor manufacturer offers three models of motors of three different outputs, such as, 3 watts, 6 watts, and 17 watts. While the motor manufacturer attempts to forecast its needs, and accordingly stock an adequate number of motors, there may be times when the manufacturer needs to produce a 17 watt model but does not have the corresponding motor in stock. To avoid this situation the motor manufacturer supplements its stock with kits so that the motor manufacturer always has the proper combination of parts and magnets on hand in order to produce a motor with the desired output.

While the invention has been described in terms of various specific embodiments, those skilled in the art will recognize that the invention can be practiced with modification within the spirit and scope of the claims.

What is claimed is:

1. A method for fabricating a motor, said method comprising the steps of:
    fabricating standardized motor parts including at least one of a rotor core and a stator core;
    ascertaining desired motor output;
    selecting at least one magnet from a group of interchangeable magnets in accordance with desired motor output; and
    assembling a motor with the selected magnet and standardized parts such that the desired output is substantially provided.

2. A method in accordance with claim 1 wherein said step of selecting further comprises the step of selecting one of a ferrite bonded magnet, a Neodymium bonded magnet and a Samarium Cobalt bonded magnet.

3. A method in accordance with claim 1 wherein said step of selecting further comprises the step of selecting from a group of interchangeable magnets with different residual induction levels and substantially similar thicknesses and lengths.

4. A method in accordance with claim 1 wherein said step of selecting further comprises the step of selecting from a group of interchangeable magnets with different residual induction levels and varying lengths.

5. A method in accordance with claim 1 wherein said step of selecting further comprises the step of selecting from a group of interchangeable ring magnets.

6. A method in accordance with claim 5 wherein said step of selecting further comprises the step of selecting from a group of interchangeable ring magnets comprising at least one crush rib.

7. A method in accordance with claim 1 wherein said step of selecting further comprises the step of selecting from a group of interchangeable magnets having substantially similar residual induction levels and different lengths.

8. A method in accordance with claim 1 further comprising:
    ascertaining a second desired motor output different from the first desired motor output;
    selecting at least one second magnet from the group of interchangeable magnets in accordance with the second desired motor output, the second magnet having at least one of a different length than the first magnet and a different residual value then the first magnet; and
    assembling a second motor with the second selected magnet and standardized parts such that the second desired output is substantially provided.

9. A method in accordance with claim 8 wherein said selecting at least one magnet further comprises selecting one of a ferrite bonded magnet, a Neodymium bonded magnet and a Samarium Cobalt bonded magnet, and said selecting at least one second magnet further comprises selecting one of a ferrite bonded magnet, a Neodymium bonded magnet and a Samarium Cobalt bonded magnet.

10. A method in accordance with claim 8 wherein said selecting at least one magnet further comprises selecting at least one magnet from a group of interchangeable magnets with different residual induction levels and substantially similar thicknesses and lengths, and said selecting at least one second magnet further comprises selecting at least one second magnet from the group of interchangeable magnets with different residual induction levels and substantially similar thicknesses and lengths.

11. A method in accordance with claim 8 wherein said selecting at least one magnet further comprises selecting at least one magnet from a group of interchangeable magnets with different residual induction levels and varying lengths, and said selecting at least one second magnet further comprises selecting at least one second magnet from the group of interchangeable magnets with different residual induction levels and varying lengths.

12. A method in accordance with claim 8 wherein said selecting at least one magnet further comprises selecting at least one magnet from a group of interchangeable ring magnets said selecting at least one second magnet further comprises selecting at least one second magnet from the group of interchangeable ring magnets.

13. A method in accordance with claim 12 wherein said selecting at least one magnet from a group of interchangeable ring magnets further comprises selecting from a group of interchangeable ring magnets comprising at least one crush rib, and said selecting at least one second magnet from a group of interchangeable ring magnets further comprises selecting from the group of interchangeable ring magnets comprising at least one crush rib.

14. A method in accordance with claim 8 wherein said selecting at least one magnet further comprises selecting at least one magnet from a group of interchangeable magnets having substantially similar residual induction levels and different lengths, and said selecting at least one second magnet further comprises selecting at least one second magnet from the group of interchangeable magnets having substantially similar residual induction levels and different lengths.

\* \* \* \* \*

UNITED STATES PATENT AND TRADEMARK OFFICE
CERTIFICATE OF CORRECTION

PATENT NO.     : 6,531,794 B1                                          Page 1 of 1
DATED          : March 11, 2003
INVENTOR(S)    : Brahmavar et al.

It is certified that error appears in the above-identified patent and that said Letters Patent is hereby corrected as shown below:

<u>Column 4,</u>
Line 55, delete "then" and insert therefor -- than --.

Signed and Sealed this

First Day of July, 2003

JAMES E. ROGAN
*Director of the United States Patent and Trademark Office*